United States Patent [19]

Pedain et al.

[11] Patent Number: 4,895,883
[45] Date of Patent: Jan. 23, 1990

[54] POLYURETHANE UREAS

[75] Inventors: Joseph Pedain, Cologne; Karl H. Pisaric, Pulheim; Walter Schröer, Leverkusen; Wilhelm Thoma, Leverkusen; Harro Träubel, Leverkusen; Karl-Arnold Weber, Leverkusen, all of Fed. Rep. of Germany

[73] Assignee: Bayer Aktiengesellschaft, Leverkusen, Fed. Rep. of Germany

[21] Appl. No.: 280,091

[22] Filed: Dec. 5, 1988

[30] Foreign Application Priority Data

Dec. 8, 1987 [DE] Fed. Rep. of Germany ....... 3741538

[51] Int. Cl.$^4$ ............................................. C08G 18/14
[52] U.S. Cl. ..................................... 521/159; 528/59; 528/60; 528/61; 528/64
[58] Field of Search ................... 521/159; 528/59, 60, 528/61, 64

[56] References Cited

U.S. PATENT DOCUMENTS 3,475,266 10/1969 Strassel ................................ 161/190
4,108,842 8/1978 Konig et al. .......................... 528/61
4,322,327 3/1982 Yoshimura et al. ................ 521/159

FOREIGN PATENT DOCUMENTS 2826232 12/1979 Fed. Rep. of Germany .
3011711 10/1981 Fed. Rep. of Germany .

Primary Examiner—Maurice J. Welsh
Attorney, Agent, or Firm—Joseph C. Gil; Thomas W. Roy

[57] ABSTRACT

The present invention is directed to polyurethane ureas which may be obtained by the reaction of a hydrophilic NCO prepolymer, which has been prepared from a polyhydroxy component based on about 9 to 100% by weight of a polyether containing about 30 to 100% by weight of ethylene oxide, or a mixture of this hydrophilic NCO prepolymer and a hydrophobic NCO prepolymer, the mixture containing $\geq$30% by weight of the hydrophilic prepolymer, with an aldimine or ketimine-containing hardener mixture in the presence of water and organic solvents, approximately 30 to 70% of the NCO groups of the prepolymers being reacted with the amino groups of the hardener and the remainder reacting with water.

The present invention is also directed to a process for the preparation of these polyurethane ureas and to coated substrates prepared from these polyurethane ureas.

10 Claims, No Drawings

POLYURETHANE UREAS

BACKGROUND OF THE INVENTION

1. Field of the Invention

This invention relates to polyurethane ureas, to a process for their production and to a process for the reactive coating of substrates, particularly sheet-form materials of fabric or leather, using the polyurethane ureas.

2. Description of the Prior Art

The reactive coating of substrates with polyurethanes is known per se; the starting products, optionally dissolved in a suitable solvent, are applied to the substrate, preferably by means of a spray gun.

In the prior art, prepolymers containing isocyanate groups and selected polyamines, for example reactive, aromatic or sterically hindered polyamines, are intensively mixed. The resulting mixture is either directly sprayed onto the substrate to be coated or, preferably, onto a temporary support and the substrate to be coated, for example leather, paper, nonwovens or fabrics in web form, is subsequently laminated on. The coated material is transported through a drying tunnel for further reaction of the coating. The substantially reacted material is then removed from the temporary support. This prior art is represented, for example, by DE-OS No. 1,570,524 (U.S. Pat. No. 3,475,266), DE-AS No. 2,637,115 (U.S. Pat. No. 4,108,842) and DE-OS No. 2,826,232 and by the literature cited therein.

SUMMARY OF THE INVENTION

The present invention is directed to polyurethane ureas which may be obtained by the reaction of a hydrophilic NCO prepolymer, which has been prepared from a polyhydroxy component based on about 9 to 100% by weight of a polyether containing about 30 to 100% by weight of ethylene oxide, or a mixture of this hydrophilic NCO prepolymer and a hydrophobic NCO prepolymer, the mixture containing ≧30% by weight of the hydrophilic prepolymer, with an aldimine or ketimine-containing hardener mixture in the presence of water and organic solvents, approximately 30 to 70% of the NCO groups of the prepolymers being reacted with the amino groups of the hardener and the remainder reacting with water.

The present invention is also directed to a process for the preparation of these polyurethane ureas and to coated substrates prepared from these polyurethane ureas.

DETAILED DESCRIPTION OF THE INVENTION

The polyhydroxy component preferably contains about 16 to 64% by weight of the polyether. The polyether preferably contains about 40 to 80% by weight of the hydrophilic NCO prepolymer of ethylene oxide.

The prepolymer mixture contains in particular about 40 to 80% by weight of the hydrophilic NCO prepolymer.

The reaction of the hydrophilic NCO prepolymer or NCO prepolymer mixture with the ketimine-containing hardener mixture is preferably continued to a conversion of about 40 to 60%, i.e., the hardener is present in a substoichiometric quantity, and the water present is used for further crosslinking until the isocyanate groups are reacted.

Polyisocyanates having an average NCO functionality of at least 1.8 may be used for the synthesis of the NCO prepolymers to be used in accordance with the invention. Suitable polyisocyanates are aliphatic, aromatic and heterocyclic polyisocyanates of the type described, for example, by W. Siefken in Justus Liebigs Annalen der Chemie, 562, pages 75 to 136. Examples include ethylene diisocyanate, 1,4-tetramethylene diisocyanate, 1,6-hexamethylene diisocyanate, 1,12-dodecane diisocyanate, cyclobutane-1'3-diisocyanate, cyclohexane-1,3- and -1,4-diisocyanate and mixtures of these isomers, 1-isocyanato-3,3,5-trimethyl-5-isocyanatomethylcyclohexane (DE-AS No. 1,202,785, U.S. Pat. No. 3,401,190), 2,4- and 2,6-hexahydrotoluylene diisocyanate and mixtures of these isomers, hexahydro-1,3- and/or -1,4-phenylene diisocyanate, perhydro-2,4'- and/or -4,4'-diphenyl methane diisocyanate, 1,3- and 1,4-phenylene diisocyanate, 2,4- and 2,6-toluylene diisocyanate and mixtures of these isomers, diphenyl methane-2,4'- and/or -4,4'-diisocyanate, naphthylene-1,5-diisocyanate, triphenyl methane-4,4',4''-triisocyanate, polyphenyl polymethylene polyisocyanates of the type obtained by phosgenation of aniline-formaldehyde condensates and described, for example, in GB-PS Nos. Bi, 874,430 and 848,671, m- and p-isocyanatophenyl sulfonyl isocyanates according to U.S. Pat. No. 3,454,606, perchlorinated aryl polyisocyanates of the type described, for example, in DE-AS No. 1,157,601 (U.S. Pat. No. 3,277,138), polyisocyanates containing carbodiimide groups of the type described in DE-PS No. 1,092,007 (U.S. Pat. No. 3,152,162), diisocyanates of the type described in U.S. Pat. No. 3,492,330, polyisocyanates containing allophanate groups of the type described, for example, in GB-PS No. 994,890, BE-PS No. 761,626 and published Dutch Patent application No. 7,102,524, polyisocyanates containing isocyanurate groups of the type described in U.S. Pat. No. 3,001,973, and DE-PS Nos. 1,022,789, 1,222,067 and 1,027,394 and DE-OS Nos. 1,929,034 and 2,004,048, polyisocyanates containing urethane groups of the type described in BE-PS No. 752,261 or U.S. Pat. No. 3,394,164, polyisocyanates containing acylated urea groups according to DE-PS No. 1,230,778, polyisocyanates containing biuret groups of the type described, for example, in DE-PS No. 1,101,394 (U.S. Pat. Nos. 3,124,605 and 3,201,372), and in GB-PS No. 889,050, polyisocyanates produced by telomerization reactions of the type described in U.S. Pat. No. 3,654,106, polyisocyanates containing ester groups of the type described in GB-PS Nos. 965,474 and 1,072,956, U.S. Pat. No. 3,567,763 and DE-PS No. 1,231,688, reaction products of the above-mentioned isocyanates with acetals according to DE-PS No. 1,072,385 and polyisocyanates containing polymeric fatty acid residues according to U.S. Pat. No. 3,455,883.

It is also possible to use the distillation residues containing isocyanate groups which are obtained in the commercial production of isocyanates, optionally in solution in one or more of the above-mentioned polyisocyanates. Mixtures of the above-mentioned polyisocyanates may also be used.

It is preferred to use 1-isocyanato-3,5,5-tri-methyl-5-isocyanatomethylcyclohexane, perhydro-4,4'-diphenylmethane diisocyanate, the isomeric toluylene diisocyanates, 4,4'-diphenylmethane diisocyanate, 1,6-hexamethylene diisocyanate, trimeric toluylene diisocyanate, i.e., the reaction product of 1 mole of trimethylolpropane and 3 moles of toluylene diisocyanate and also the mixed trimer of 3 moles of toluylene diisocyanate and 2 moles of hexamethylene diisocyanate.

Suitable reactants for the polyisocyanates mentioned above for the production of the NCO prepolymers are polyhydroxyl compounds which have a molecular weight of about 400 to 10,000 and preferably about 1,000 to 6,000, for example polyesters, polyethers, polythioethers, polyacetals, polycarbonates and polyester amides containing at least 2, preferably 2 to 8 and more preferably 2 to 4 hydroxyl groups, of the type known for the production of homogeneous and cellular polyurethanes.

Suitable hydroxyl-containing polyesters include reaction products of polyhydric, preferably dihydric and, optionally, trihydric alcohols with polybasic, preferably dibasic, carboxylic acids. Instead of using the free polycarboxylic acids, it is also possible to use the corresponding polycarboxylic acid anhydrides or corresponding polycarboxylic acid esters of lower alcohols or mixtures thereof for the production of the polyesters. The polycarboxylic acids may be aliphatic, cycloaliphatic, aromatic and/or heterocyclic and may optionally be substituted, for example by halogen atoms, and/or unsaturated. Polyesters of lactones, for example ε-caprolactone, or hydroxycarboxylic acids, for example ω-hydroxycaproic acid, may also be used.

Examples of such polycarboxylic acids include succinic acid, adipic acid, suberic acid, azelaic acid, sebacic acid, phthalic acid, isophthalic acid, trimellitic acid, phthalic anhydride, tetrahydrophthalic anhydride, hexahydrophthalic anhydride, tetrachlorophthalic anhydride, endomethylene tetrahydrophthalic anhydride, glutaric anhydride, maleic acid, maleic anhydride, fumaric acid, dimeric and trimeric fatty acids (such as oleic acid, optionally in admixture with monomeric fatty acids), terephthalic acid dimethyl ester and terephthalic acid-bis-glycol ester.

Suitable polyhydric alcohols include ethylene glycol, 1,2- and 1,3-propylene glycol, 1,3-, 1,4- and 2,3-butylene glycol, hexane-1,6-diol, octane-1,8-diol, neopentyl glycol, cyclohexane dimethanol (1,4-bishydroxymethyl cyclohexane), 2-methyl-1,3-propanediol, glycerol, trimethylolpropane, 1,2,6-hexanetriol, 1,2,4-butanetriol, trimethylol ethane, pentaerythritol quinitol, mannitol, sorbitol, methyl glycoside, diethylene glycol, triethylene glycol, tetraethylene glycol, polyethylene glycols, dipropylene glycol, polypropylene glycols, dibutylene glycol and polybutylene glycols. The polyesters may contain terminal carboxyl groups.

The polyethers containing at least 2, preferably 2 to 8 and more preferably 2 to 3 hydroxyl groups which may be used in accordance with the invention are also known and are obtained, for example, by polymerization of epoxides such as ethylene oxide, propylene oxide, butylene oxide tetrahydrofuran, styrene oxide or epichlorohydrin with themselves, for examples in the presence of $BF_3$, or by the addition of these epoxides, optionally in admixture or successively, onto starter components containing reactive hydrogen atoms such as water, alcohols, ammonia or amines. Examples include ethylene glycol, 1,3- or 1,2-propylene glycol, trimethylolpropane, 4,4'-dihydroxydiphenyl propane, aniline, ethanolamine or ethylenediamine. Sucrose polyethers, of the type described for example in DE-AS Nos. 1,176,358 and 1,064,938, may also be used in accordance with the invention. In many cases, it is preferred to use polyethers predominantly containing primary OH groups (up to about 90% by weight, based on all of the OH groups present in the polyether). Polyethers modified by vinyl polymers, of the type formed by polymerization of styrene and acrylonitrile in the presence of polyethers (U.S. Pat. Nos. 3,383,351, 3,304,273, 3,523,093 and 3,110,695 and DE-PS No. 1,152,536) are also suitable, as are polybutadienes containing OH groups.

Included among the polythioethers are the condensation products of thiodiglycol with itself or with other glycols, dicarboxylic acids, formaldehyde, amino-carboxylic acids or amino alcohols. Depending on the co-components, the products are polythio mixed ethers, polythioether esters or polythioether ester amides.

Suitable polyacetals include the compounds obtainable from glycols (such as diethylene glycol, triethylene glycol, 4,4'-dioxethoxydiphenyl dimethylmethane and hexanediol) and formaldehyde. Polyacetals suitable for use in accordance with the invention may also be prepared by the polymerization of cyclic acetals.

Suitable hydroxyl-containing polycarbonates include those which are known and may be obtained, for example, by the reaction of diols (such as propane-1,3-diol, butane-1,4-diol, hexane-1,6-diol, diethylene glycol, triethylene glycol or tetraethylene glycol) with phosgene or diaryl carbonates (such as diphenyl carbonate).

The polyester amides and polyamides include the predominantly linear condensates obtained from polybasic, saturated and unsaturated carboxylic acids or their anhydrides and polyhydric, saturated and unsaturated amino alcohols, diamines and polyamines the di- and polyamines being employed in admixture with amine alcohols and/or polyhydroxy components.

Polyhydroxyl compounds containing urethane or urea groups and optionally modified natural polyols, such as castor oil, carbohydrates or starch, may also be used. Adducts of alkylene oxides with phenol-formaldehyde resins or with urea-formaldehyde resins may also be used in accordance with the invention.

Representatives of these compounds which are suitable for use in accordance with the invention are described, for example in High Polymers, Vol. XVI, "Polyurethanes, Chemistry and Technology," Saunders-Frisch, Interscience Publishers, New York, London, Vol. I, 1962, pages 32–42 and pages 44–54, and Vol. II, 1964, pages 5–6 and 198–199, and in Kunststoff-Handbuch, Vol. VII, Vieweg-Höchtlen, Carl-Hanser-Verlag, München, 1966, for example on pages 45 to 71.

It is of course possible to use mixtures of the above-mentioned compounds containing at least two hydroxyl groups and having a molecular weight of about 400 to 10,000, for example mixtures of polyethers and polyesters.

According to the invention, however, it is also possible to use polyhydroxyl compounds containing high molecular weight polyadducts or polycondensates in finely dispersed or dissolved form. Modified polyhydroxyl compounds such as these are obtained when polyaddition reactions (for example reactions between polyisocyanates and aminofunctional compounds) or polycondensation reactions (for example reactions between formaldehyde and phenols and/or amines) are directly carried out in situ in the hydroxyl-containing compounds mentioned above. Processes such as these are described, for example, in DE-AS Nos. 1,168,075 and 1,260,142 and DE-OS Nos. 2,324,134, 2,423,984, 2,512,385, 2,513,815, 2,550,796, 2,550,797, 2,550,833 and 2,550,862. However, it is also possible in accordance with U.S. Pat. No. 3,869,413 or DE-OS No. 2,550,860 to mix an aqueous polymer dispersion with a polyhydroxyl compound and subsequently to remove the water from the mixture.

When modified polyhydroxyl compounds of the type mentioned above are used as starting component in the polyisocyanate polyaddition process, polyurethane plastics having considerably improved mechanical properties are formed in many cases.

Low molecular weight polyols having a molecular weight of less than 400, which are known as chain-extending agents, may also be used in the production of the NCO prepolymers. Preferred polyols of this type are ethanediol, butane-1,4-diol and trimethylolpropane, although it is also possible to use propane-1,3- and -1,2-diol, butane-1,3-, -1,4- and 2,3-diol, pentane-1,5-diol, hexane-1,6-diol, bis hydroxyethyl hydroquinone, glycerol and N-methyl hydroxyethyl amine.

The polyether used for the preparation of the hydrophilic prepolymer is preferably an ethylene oxide homopolymer or copolymer. Suitable copolymer constituents include propylene oxide (POX), butylene oxide, tetrahydrofuran or styrene oxide. The polymerization may be carried out in the presence of catalysts, for example boron trifluoride, or by addition onto the above-mentioned starter components containing reactive hydrogen atoms.

It is particularly preferred to use EOX-POX polyethers and EOX-tetramethylene oxide polyethers. The hydrophilic polyethers preferably have molecular weights of about 500 to 5,000, preferably about 1,000 to 2,500 and are linear or branched.

The NCO prepolymers are prepared in known manner by suitably reacting relatively high molecular weight polyhydroxyl compounds and, optionally, chain-extending agents with excess polyisocyanate. The reaction is carried out at an NCO:OH equivalent ratio of about 1.2 to 6.0, preferably about 1.6 to 3.0.

The ketimine-containing hardener mixture is preferably a mixture of compounds corresponding to the formulae

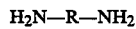

$$H_2N-R-NH_2 \quad A$$

$$H_2N-R-N=R_1 \quad B$$

and

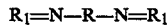

$$R_1=N-R-N=R_1 \quad C$$

wherein

R is a divalent aliphatic, cycloaliphatic or araliphatic $C_2$-$C_{18}$ radical which may also contain the groups —O— or

$$\begin{array}{c} -N- \\ | \\ X \end{array}$$

(X=H, —$CH_3$, —$C_2H_5$, —$C_3H_7$, —$C_4H_9$) and $R_1$ is an aliphatic or cycloaliphatic radical of the type formed by the removal of oxygen from a ketone or aldehyde containing 2 to 8, preferably 3 to 6 carbon atoms.

The following molar ratios may be used according to the invention:
  A/B+C=about 1:20 to 1:3, preferably about 1:10 to 1:15,
  B/C=about 1:2 to 2:1, preferably about 1:1.5 to 1.5:1 and
  A+B+C/$H_2O$=about 1:1.4 to 1:20, preferably about 1:1.4 to 1:10.

The hardener mixtures to be used in accordance with the invention include polyamines containing at least 2 aliphatically bound $NH_2$ groups. Suitable polyamines include ethylenediamine, trimethylenediamine, tetramethylenediamine, hexamethylenediamine, propylenediamine, isomer mixtures of 2.2,4- and 2,4,4-trimethyl hexamethylenediamine, 1,3- and 1,4-xylylenediamine, bis-(2-aminoethyl)-amine and methyl-bis-(3-aminopropyl)amine.

According to the invention, cycloaliphatic diamines are preferred and examples include the following compounds:

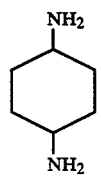

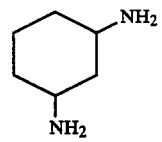

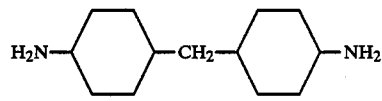

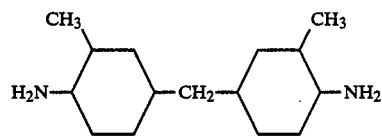

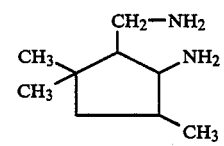

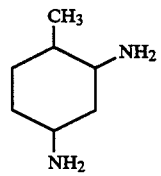

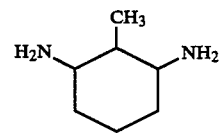

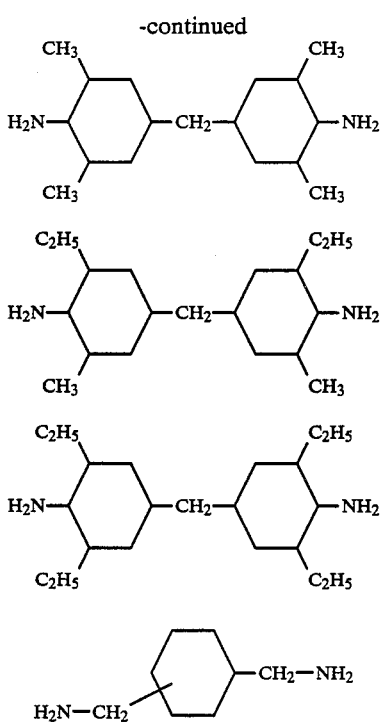

Preferred cycloaliphatic diamines include

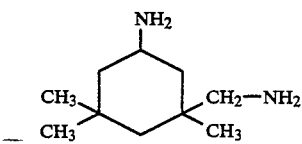

Mixtures of the amines with the corresponding aldimines or ketimines and water, rather than the pure amines, are used in the process according to the invention. These mixtures may be prepared as follows:

The bis-ketimine or bis-aldimine is prepared from the diamines and excess ketone or aldehyde in known manner by heating and may be isolated as a pure substance. Only water and, optionally, free diamine are added to these bis-ketimines or bis-aldimines. The quantity of water required according to the invention is greater than the quantity required for complete hydrolytic cleavage of the ketimine or aldimine groups present. The desired degree of hydrolysis may then be established by heating. The quantity of water may be varied within the claimed limits in such a way that the reactivity of the hardener mixture may be fully adapted to the reactivity of the NCO prepolymer and the hardening conditions. The free diamine, the diamine blocked with 1 molecule of ketone or aldehyde and the diamine blocked at both amino groups should be present in the hardener mixture at the time of hardening in the ratio claimed in accordance with the invention. It is particularly surprising that, despite the excess of water, the majority of the amino groups remains blocked at room temperature and only a relatively small quantity of free diamine is present. The composition of the hardener mixture may readily be determined by various analytical techniques (for example by gas chromatography).

The hardener mixture to be used in accordance with the invention may also be prepared without the bis-ketimine or the bis-aldimine being isolated. For example, the diamine is heated with the ketone and/or the aldehyde to the boiling temperature and boiled under reflux without separating off the released water. A mixture of diamine, partially blocked diamine and bis-ketimine or bis-aldimine is obtained in this way; however, it is unsuitable for the process according to the invention due to its low water content. The addition of more water provides a suitable hardener mixture in which the quantitative ratios of the components lies within the claimed limits.

Aldehydes and ketones suitable for use in accordance with the invention are those containing 2 to 8 and preferably 3 to 6 carbon atoms such as acetylaldehyde, propionaldehyde, butyraldehyde, isobutyraldehyde, acetone, methyl ethyl ketone, methyl isobutyl ketone, diisopropyl ketone, cyclopentanone and cyclohexanone.

The reaction of the NCO prepolymers with the ketimine-containing hardener mixture is carried out in the presence of organic solvents. The reaction mixture preferably contains less than about 50% by weight, more preferably less than about 40% by weight of solvent. Solvents are often used in the hardener mixture to simplify dosing. Suitable solvents both for the NCO prepolymer and for the hardener mixture include hydrocarbons such as toluene or xylene; esters such as ethyl glycol acetate, ethyl acetate and methoxypropyl acetate; and ketones such as acetone, methyl ethyl ketone, methyl isobutyl ketone and cyclohexanone. Other known solvents such as dimethyl formamide may also be used.

However, it is preferred in accordance with the invention to use non-toxic, substantially apolar solvents. The reaction of the prepolymer containing isocyanate groups with the hardener mixture generally takes place at a temperature of about 10° to 100° C., preferably about 50° to 80° C.

The ketimine-containing mixtures or preparations used as hardeners or chain extenders are known, for example, from DE-OS No. 2,637,115 (U.S. Pat. No. 4,108,842, herein incorporated by reference).

According to the invention about 30 to 70%, preferably about 40 to 60% of the NCO groups in the NCO prepolymers are reacted with the amino groups of the aldimine- or ketimine-containing mixtures. The remaining NCO groups react with water or with other components added, if any, for example small quantities of alcohol such as methanol or ethanol. Typical representatives of the polyurethane ureas according to the invention are those prepared using a mixture of hydrophilic and hydrophobic NCO prepolymers in which the hydrophilic NCO prepolymer makes up about 70% by weight of the mixture and the hydrophilic NCO prepolymer is a polyether-NCO prepolymer with an EOX content in the polyether of about 46% by weight and the reaction of the NCO prepolymer mixture with the hardener mixture is continued to a conversion of about 50%.

Auxiliaries and additives such as known levelling agents, stabilizers, catalysts and pigments, may be used in the production of the polyurethane ureas according to the invention, particularly in regard to their use as coating materials.

The present invention also relates to a process described above for the coating of substrates.

The process according to the invention may be used for the production of coatings on fabrics, leather, foamed and compact plastics, paper, wood, metals and other sheet-form materials, both by direct coating and by reverse coating (using release films, release runners, release papers or matrices as temporary supports). The process according to the invention is preferably used for coating sheet-form materials such as fabric or leather.

Coatings on leather, for example skiver, or fabric substrates using the polyurethane ureas according to the invention prepared from the hydrophilic NCO prepolymers or prepolymer mixtures by reaction with ketimine mixtures containing amino groups in the presence of water are distinguished by a number of advantages over the prior art.

The NCO groups (remaining from the substoichiometric use of hardener) react with water with the elimination of $CO_2$ and foaming. Thus, the coating acquires particular softness, suppleness and fullness. At the same time, surface irregularities in the substrate, particularly the highly irregular surface of skiver, are smoothed out.

Another surprising feature is the considerable improvement in the resistance of the coatings to hydrolysis although the penetration of water into the layer is promoted by the hydrophilicity introduced into the system in the form of the polyethylene oxides (EOX). Another advantage is the increased permeability to water vapor produced by the hydrophilic prepolymers in the system.

The following examples are intended to illustrate the process according to the invention without limiting it in any way. Quantities are to be understood as parts by weight or percentages by weight, unless otherwise indicated.

EXAMPLES

Preparation of the Prepolymers

Prepolymer I (In accordance with DE-OS No. 3,011,711, prepolymer I)

6,000 g of a polyester of adipic acid and a mixture of hexane-1,6-diol and neopentyl glycol in a molar ratio of the diols of 11:6 (OH value 66, molecular weight 1,700) were dehydrated in vacuo at 80° to 90° C. 1,290 g of toluylene diisocyanate (80% 2,4-isomer) were then added and the mixture was left to react while stirring for 30 minutes at 90° C. 320 g of a mixed trimer of 3 moles of 2,4-toluylene diisocyanate and 2 moles of 1,6-hexamethylene diisocyanate (5 mole-%, based on the isocyanate component as a whole) were then added (cf. DE-OS No. 3,011,711). The reaction mixture was left to react for 30 minutes at 90° C., cooled to 60° C. and diluted to 80% with 1,900 g of ethyl acetate. NCO content: 3.45% by weight; NCO:OH equivalent ratio 2:1. NCO equivalent weight 1,217 g.

Prepolymer II

Using the procedure for prepolymer I, 3,450 g of the polyester used for prepolymer I and 3,000 g of a polyether (OH value 56, molecular weight 2,000) based on 50% by weight of ethylene oxide and 50% by weight of propylene oxide and started with 1,2-propylene glycol were reacted after dehydration with 1,290 g toluylene diisocyanate and with 320 g of the mixed trimer described in prepolymer I. The NCO prepolymer obtained was diluted with 2,015 g of toluene to a solids content of 80%. NCO content: 3.26%, NCO equivalent weight 1,288 g.

Prepolymer III

After dehydration, 1,000 g of a linear polyether based on 50% by weight of ethylene oxide, 50% by weight of propylene oxide and started with 1,2-propylene glycol (OH value 56) and 1,000 g of a trifunctional polyether of 27.5% by weight of propylene oxide, 72.5% by weight of ethylene oxide and started with glycerol (OH value 36) were reacted at 90° C. with 666 g 4,4'-diphenyl methane diisocyanate. Reaction time 45 minutes. NCO content: 5.8%, NCO equivalent weight 724 g.

Prepolymer IV

After dehydration, 1,000 g of a linear polyether based on 100% by weight of ethylene oxide and started with diethylene glycol (OH value 56) and 1,000 g of the trifunctional polyether (OH value 36) described for prepolymer III were reacted at 90° C. with 464 g of toluylene diisocyanate (80% 2,4-isomer) and diluted with 435 g toluene to a solids content of 85%. NCO content: 5.33%, NCO equivalent weight 788 g.

Prepolymer V

After dehydration, 1,000 g of a dihydroxytetramethylene glycol polyether (OH value 56) and 1,000 g of the trifunctional polyether (OH value 36) described for prepolymer III were reacted at 90° C. with 666 g 4,4'-diphenyl methane diisocyanate. The reaction time was 45 minutes. The NCO prepolymer was diluted with 665 g methyl ethyl ketone to a solids content of 80%. NCO content: 4.64%, NCO equivalent weight: 905 g. Hardener mixture:

A mixture of 170 g 3,3,5-trimethyl-5-aminoethyl cyclohexylamine (IPDA), 13 g water and 417 g methyl ethyl ketone was boiled under reflux for 2 hours. After cooling, the mixture was ready for use as a hardener.

Of the 170 g (1 mole) of IPDA used, (A) 12.9 mole % were present in the mixture as free IPDA, (B) 41.6 mol % as

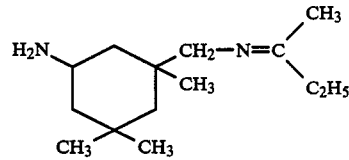

(C) 45.5 mole % as bis-methyl ethyl ketone ketimine of IPDA. The composition was calculated from the gas-chromatographic analysis of the mixture.

The mixture contained 37.9 g water, which was made up from the total water of reaction and the quantity of 13 g additionally used, and 120 g of a prepolymer prepared from tolylene diisocyanate and a propyleneglycol-started propylene oxide polyether, OH value 56, gram-molecular weight 2,000. The quantity of water theoretically required for hydrolytic cleavage of the ketimine groups to amino groups is 24.9 g. The $NH_2$ equivalent weight of the hardener mixture is 600 g.

EXAMPLE 1

Skiver is coated by the reverse process using a two-component PUR gun spraying machine. The principal components of the gun spraying machine are a heatable storage for the hardener preparation, a dosing unit for the hardener preparation, a dosing unit for the prepolymer and, for mixing and spraying the components, a two-component PU spray gun of the type described in DE-OS No. 2,746,188 (U.S. Pat. No. 4,310,493), a heatable feed pipe for the prepolymer, a heatable feed pipe for the hardener, a pipe for solvent and a compressed air line.

150 g of prepolymer I and 350 g of prepolymer III were introduced into the heatable storage container and heated to 50°–80° C. to lower the viscosity. The hardener preparation was introduced into its container together with, for example, 10% by weight of a pigment preparation (60% by weight of $TiO_2$, 27% by weight of polyacrylate and 13% by weight of cyclohexanone) per hardener equivalent. The additon of the pigment preparation increased in $NH_2$ equivalent of the hardener mixture to 660 g.

The prepolymer mixture and 199.5 g of hardener preparation, corresponding to 50% of the calculated quantity of amine, were introduced into the gun through separate pipes with dosing units in between. The constituents of the reaction mixture were intensively mixed very quickly in the mixing compartment and in the mixing tube of the two-component PU spray gun, as described in detail in DE-OS No. 2,746,188 (U.S. Pat. No. 4,310,493). The resulting mixture was forced by compressed air through the exit nozzle. The reaction of the components began immediately, i.e., during the mixing process itself.

On exiting from the gun, the mixture was additionally mixed by air eddies produced by compressed air (operating pressure 3–6 kg/cm$^2$) and the conical shape of the spray jet was converted into a flat jet. During the spraying of the product mixture, the gun was moved back and forth about 25 to 35 times per minute over a width of 150 cm by means of a carriage. A matrix coated with silicone rubber, which bore a reverse impression of natural leather was allowed to run through beneath the gun at a rate of 2 to 10 meters per minute. The mixture sprayed onto the matrix leveled out to form a film. The viscosity rose immediately and a paste-like state was reached about 30 to 90 seconds after spraying. The skiver or any other substrate to be coated is placed and pressed onto or into the reacting mixture. The entire coating then passed through a drying tunnel heated to 60° to 120° C. About 3 to 6 minutes after spraying, the coating was removed tack-free from the matrix and from the temporary support.

The polyurethane urea layer is generally 0.15 to 0.45 mm thick.

The coated skiver had a grain similar to natural leather and could be stacked after a short time and processed, for example on standard shoe machines. The adhesion between the coating and skiver was excellent while the feel was pleasantly dry, soft and full. The covering of surface irregularities of the skiver was excellent. The resistance of the PU coating to hydrolysis far exceeded the prior art. The permeability to water vapor according to DIN 53 333 measured 0.5 to 10 mg/cm$^2$.h. The coated leathers withstood the Flexometer test:

1. when dry (can be flexed more than 100,000 times without damage)
2. when wet (can be flexed more than 100,000 times without damage)
3. at −25° C. (can be flexed far more than 10,000 times without damage).

The hot iron test at 150° C. produced no visible damage.

The strength of adhesion of the coating to the substrate was higher than the internal strength of the the cohesion of the coating material. The film strength measured 12 Mpa.

EXAMPLE 2

500 g of prepolymer II and 128 g of the hardener preparation containing a pigment preparation as in Example 1 were reacted and processed as in Example 1. The quantity of hardener, based on amino groups, was 50% of the calculated quantity, based on the NCO groups in the prepolymer. The remaining NCO groups reacted with water with elimination of $CO_2$. These coated skiver had a pleasant feel, showed good grain imitation and were even fuller than the comparison in Example 1 by virtue of the larger content of $H_2O$ and the smaller content of amine in the hardener. The Flexometer test was again passed with the same results as in Example 1.

EXAMPLE 3

500 g prepolymer IV and 293 g of the pigment-containing hardener preparation of Example 1 were mixed and further processed as described in Example 1. The quantity of hardener, based on amino groups, was 70% of the calculated quantity, based on the NCO content of the prepolymer used. The coating was softer than Example 1. In addition, the vigorous evolution of $CO_2$ due to the high NCO content was responsible for a much more foamy coating than in Example 1.

EXAMPLE 4

500 g of prepolymer V and 166 g of pigment-containing hardener preparation (see Example 1) were mixed as described in Example 1 and sprayed onto a matrix having a grained surface. Polyester/cotton fabric (fabric weight approx. 200 g/m$^2$) was laminated onto the reaction mixture. The quantity of amino groups in the hardener was sufficient for crosslinking 30% of the NCO groups in the prepolymer. The remaining 70% of the NCO groups reacted with water. A textile material was obtained which was provided with a PU coating giving it a leather-like appearance and a pleasant, full feel. The Flexometer values corresponded to the values of Example 1, as did the permeability to water vapor values which, at this level, were expectedly high in view of the good mechanical/physical properties.

EXAMPLE 5

In a first coating on an endless temporary support, the prepolymer mixture of Example 1 was reacted with the theoretical quantity of a hardener preparation (containing 15% of a pigment preparation - $TiO_2$ paste in polyacrylate and cyclohexanone), based on hardener preparation, as described under "hardener mixture" on page 6 of DE-OS No. 2,637,115, in such a way that the NCO:NH$_2$ equivalent ratio was 1.08:1 and the quantity of coating applied amounted to 150 g of NCO prepolymer per m$^2$. The prepolymer used had an NCO content of 3.4% and the following formulation:

100 g of prepolymer and
53.5 g of the pigment-containing hardener preparation and, hence, as the feed rate for a working speed of 3 m/minute for a spraying width of 1.50 m
675 g/min of prepolymer and
361 g/min of hardener preparation.

The mixture according to Example 1 was sprayed as a second coating onto the first coating, performing the function of a primer coat, in a quantity of 150 g/m$^2$, based on the quantity of prepolymer.

A hide skiver was laminated into the reacting mixture of the second coating, followed by further processing as in Example 1. On completion of the reaction, the coated skiver was removed from the release paper. The coating obtained reproduced the grain of the release paper without any pores or holes in the surface. The coated skiver had a pleasant, full feel and a fine grain.

The adhesion of the coating to the skiver was excellent, while the permeability to water vapor was, as expected, distinctly lower than in Example 1, although scratch resistance was distinctly increased in comparison with the coating of Example 1.

EXAMPLE 6

500 g of prepolymer III was sprayed with 217 g of the hardener preparation of Example 1 onto an endless temporary support. The quantity of amino groups in the hardener comprised 60%, based on NCO groups. The coating on skiver was soft, full, extremely permeable to water vapor and similar to finished grain leather.

EXAMPLE 7

Example 5 was repeated except that instead of skiver a heavily buffed, seriously grain-damaged leather was coated on the grain side. The damage to the starting material was so serious that this leather could not be worked up by standard methods into a quality, usable material, inter alia on account of brand marks. The covering power of the coating was surprising, almost completely concealing the brand marks. The adhesion of the coating to the grain leather was very good because a heavily buffed material, i.e., corresponding to a nubuk leather was coated. The suppleness of the coated leather was higher because the leather substrate influenced this effect particularly favorably in the present example.

EXAMPLE 8

Example 7 was repeated except that the hardener preparation was completely replaced by water in the primer coating in a small-scale laboratory test. The reaction was so slow that lamination was not possible at the operationally necessary time. Nor could the reaction be accelerated by chemical catalysis to an extent that it was suitable for large-scale production. Foaming could not be achieved because the foam collapsed uncontrollably after formation.

EXAMPLE 9

Example 7 was repeated except that the hardener for the primer coating was used in an amount sufficient to provide an equivalent ratio of NCO:NH$_2$ of 1.08:1 and no water is added. The reaction was so fast that lamination was not possible because adequate adhesion could not be obtained. In addition, the excessively fast reaction precluded the formation of a genuine film because the reaction mixture was already largely in the form of small "dollops" by the time it reached the temporary support, could no longer "run" (mucus), and was regarded as a partly inhomogeneous foam. The uniform foam structure presupposed a decelerated reaction which, for an NCO value of 4.64%, could not be achieved by a dosage corresponding to the NCO:NH$_2$ stoichiometry, but required the addition and distribution of a quantity of water for the reaction as a whole.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyurethane urea obtained by reacting
   (a) a hydrophilic NCO prepolymer prepared from a polyhydroxy component containing about 9 to 100% by weight of a polyether, said polyether having an ethylene oxide content of about 30 to 100% by weight with
   (b) an aldimine- or ketimine-containing hardener mixture in the presence of water and organic solvents, said hardener being used in an amount sufficient to provide about 30 to 70% of the amino groups, either in free or blocked form, needed to react with the NCO groups of component (a), the remainder of the NCO groups reacting with water.

2. The polyurethane urea of claim 1 wherein component (a) comprises a mixture containing greater than or equal to 30% by weight of said hydrophilic NCO prepolymer with the remainder comprising a hydrophobic NCO prepolymer.

3. The polyurethane urea of claim 2 wherein said polyhydroxy component comprises about 16 to 64% by weight of said polyether.

4. The polyurethane urea of claim 1 wherein said polyether comprises about 40 to 80% by weight of ethylene oxide.

5. The polyurethane urea of claim 2 wherein said mixture comprises about 40 to 80% by weight of said hydrophilic NCO prepolymer.

6. The polyurethane urea of claim 1 wherein said hardener is used in an amount sufficient to provide about 40 to 60% of the amino groups necessary to react with said isocyanate groups of component (a).

7. The polyurethane urea of claim 1 wherein said polyether comprises a copolyether based on ethylene oxide and propylene oxide or ethylene oxide and tetramethylene oxide.

8. A process for the preparation of a polyurethane urea which comprises reacting
   (a) a hydrophilic NCO prepolymer prepared from a polyhydroxy component containing about 9 to 100% by weight of a polyether, said polyether having an ethylene oxide content of about 30 to 100% by weight with
   (b) an aldimine- or ketimine-containing hardener mixture in the presence of water and organic solvents, said hardener being used in an amount sufficient to provide about 30 to 70% of the amino groups, either in free or blocked form, needed to react with the NCO groups of component (a), the remainder of the NCO groups reacting with water.

9. A coated substrate prepared by coating a substrate with the polyurethane urea of claim 1 and curing said coating.

10. The coated substrate of claim 9 wherein said substrate is a fabric or leather substrate.

* * * * *